US008602335B2

(12) United States Patent
Krasznai

(10) Patent No.: US 8,602,335 B2
(45) Date of Patent: Dec. 10, 2013

(54) ADJUSTABLE WIDTH SLICING DISC FOR A FOOD PROCESSOR

(75) Inventor: Charles Z Krasznai, Bridgeport, CT (US)

(73) Assignee: Conair Corporation, Stamford, CT (US)

( * ) Notice: Subject to any disclaimer, the term of this patent is extended or adjusted under 35 U.S.C. 154(b) by 986 days.

(21) Appl. No.: 12/333,638

(22) Filed: Dec. 12, 2008

(65) Prior Publication Data

US 2009/0314168 A1    Dec. 24, 2009

Related U.S. Application Data

(60) Provisional application No. 61/013,175, filed on Dec. 12, 2007.

(51) Int. Cl.
*B02C 17/02* (2006.01)
*B07B 13/00* (2006.01)

(52) U.S. Cl.
USPC ............................ 241/92; 241/278.1; 241/296

(58) Field of Classification Search
USPC ......................................... 241/92, 278.1, 296
See application file for complete search history.

(56) References Cited

U.S. PATENT DOCUMENTS

| 2,583,997 | A | * | 1/1952 | Chester | 241/46.013 |
| 4,283,979 | A | * | 8/1981 | Rakocy et al. | 83/666 |
| 4,364,525 | A | * | 12/1982 | McClean | 241/92 |
| 4,601,429 | A | * | 7/1986 | Stottmann et al. | 241/92 |
| 4,877,191 | A | * | 10/1989 | Golob et al. | 241/92 |
| 5,960,709 | A | * | 10/1999 | Yip | 99/510 |
| 5,992,287 | A | * | 11/1999 | Dube | 83/865 |

* cited by examiner

*Primary Examiner* — Bena Miller
(74) *Attorney, Agent, or Firm* — McCormick, Paulding & Huber LLP

(57) ABSTRACT

A rotatable slicing disc 1 for use in a food processor has a flat disc body 2 having a radially extending gap 3 formed therein and extending generally from a central hub 4 to a circumferential edge 5. A cutting blade 6 having a cutting edge 7 is attached to a blade support arm 8 with a support hub 9. The support hub 9 is telescopically received inside of a hub collar 10 and an adjusting sleeve 13 is mounted to the hub 9 via internal threads so that they may be longitudinally adjusted relative to each other in order to selectively adjust slicing width.

8 Claims, 3 Drawing Sheets

ADJUSTABLE WIDTH SLICING DISC FOR A FOOD PROCESSOR

CROSS-REFERENCE TO RELATED APPLICATIONS

This application is related to and claims priority from U.S. Provisional application No. 61/013,175 filed 12 Dec. 2007.

BACKGROUND OF THE INVENTION

1. Field of the Invention

The present invention relates to kitchen appliances and, more particularly, to food processors for chopping and mixing food products.

2. Description of Related Art

Various known food processors exist that comprise, generally, a base housing an electric motor, a drive system, a rotatably driven blade, a bowl, a lid, a feed chute, and a feed pusher. The feed chute allows food to be introduced into the bowl while the lid engages the bowl and while the blade is rotating. This contains chopped food product inside the bowl and prevents user's hands from entering the bowl while the device is operating, since the chute is sized so that a user's hand cannot fit through it.

While the rotatable driven blade may be in any one of various known forms, a common form is a flat disc that has a radially extending gap of which the edge leading toward the rotational direction is used to cut or slice food product. The leading edge is off-set from the plane of the rest of the disc so that it defines a slice thickness. Typically the gap is formed be press cutting a single metal sheet that forms the disc and bending the area that attaches the leading edge to the rest of the disc. Sometimes an attachment is fixed to the disc. In either form, the slice thickness gap is fixed and constant. As a result, owners of food processors are required to purchase more than one disc in order to have the capability of producing more than one slice thickness.

OBJECTS OF THE PRESENT INVENTION

It is an object of the present invention to provide a sliding disc for a food processor that accommodates more than one slice thickness.

These and other objects are achieved by the present invention.

DETAILED DESCRIPTION OF THE PREFERRED EMBODIMENT OF THE INVENTION

Figure 1:
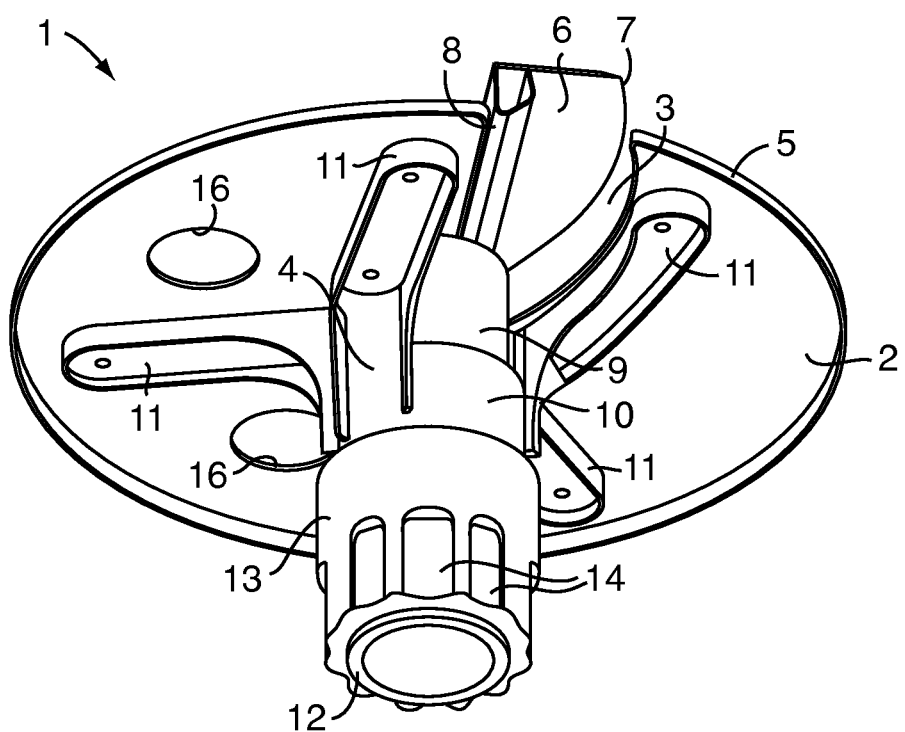
FIG. 1 is a perspective view of a first embodiment of the present invention.
Figure 2:
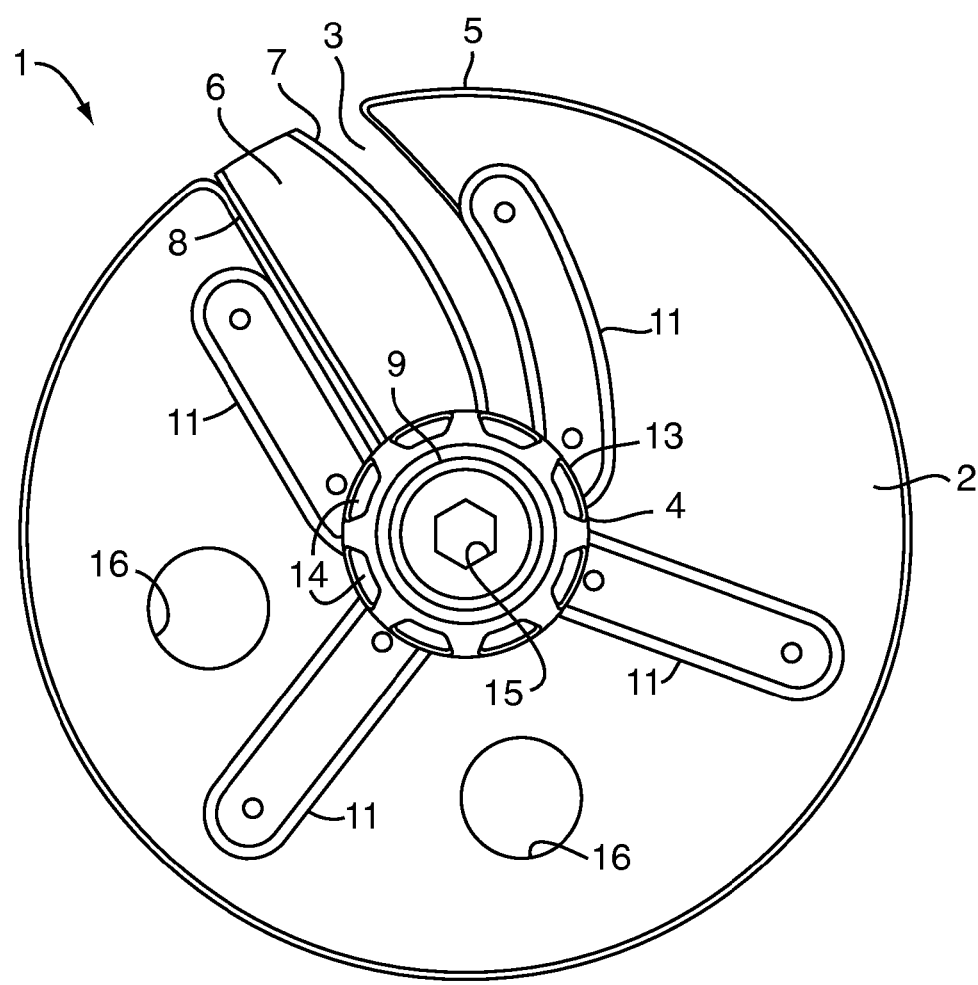
FIG. 2 is a top view of a first embodiment of the present invention.
Figure 3:
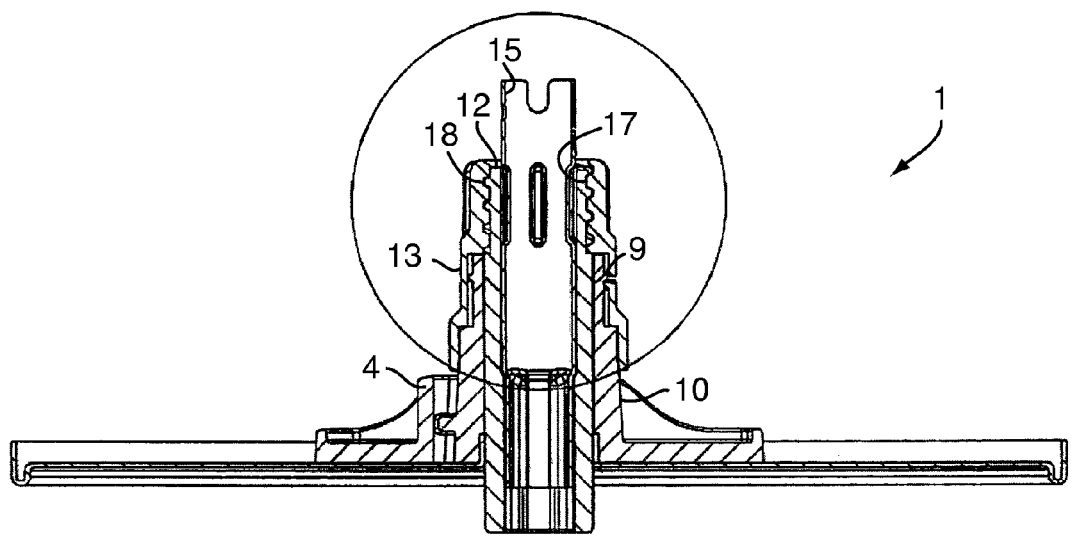
FIG. 3 is a partial, side, cross-sectional view of a first embodiment of the invention.
Figure 4:
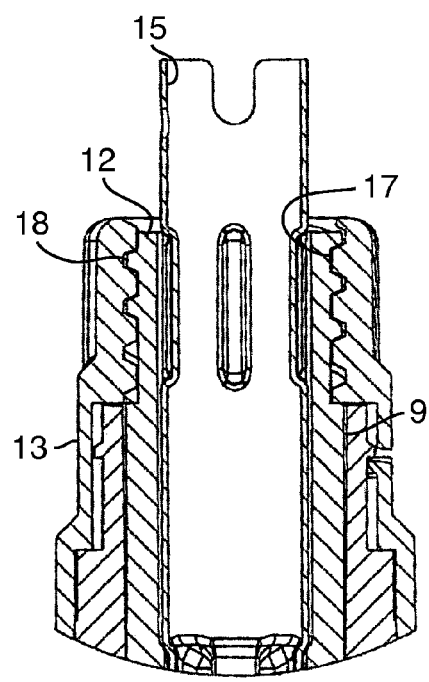
FIG. 4 is a partial, side, cross-sectional view of a first embodiment of the invention.

Referring to FIGS. 1-2, a rotatable slicing disc 1 for use in a food processor comprises a generally flat disc body 2 having a radially extending gap 3 formed therein and extending generally from a central hub 4 to a circumferential edge 5. The gap 3 may have a slightly arcuate shape to optimize cutting edge performance. A cutting blade 6 having a cutting edge 7 is attached to a blade support arm 8 which is formed unitarily with a support hub 9. Preferably, the cutting edge 7 is curved or arcuate to optimize cutting performance. The support hub 9 is telescopically received inside of a hub collar 10. A plurality of disc support arms 11 extend radially out from the hub collar 10 and support the disc body 2. The support hub 9 has a proximal end 12 about which an adjusting sleeve 13 is mounted. The sleeve 13 may have ribs 14 for enhanced gripping by a user's hand.

The proximal end 12 and the sleeve 13 adjustably interface with each other via threads (17, 18) or other known means so that they may be longitudinally adjusted relative to each other such that rotating the sleeve 13 advances the support hub 9 and, thus, the attached blade 7 in a longitudinal direction relative to the disc body 2 in order to selectively adjust slicing width. For example, preferably the sleeve 13 has internal threads (17) and the proximal end 12 of the hub 9 has external threads (18), so that rotation of the sleeve 13 relative to the hub 9 will cause the hub 9 to move linearly toward or away from the sleeve 13, depending on direction of rotation. This facilitates adjustment of the position of the cutting edge 7 in a plane generally parallel to the disc body 2. This results in adjusting thickness of slicing of food products by the cutting edge 7. A torque transmitting opening 15 is provided for mounting the disc assembly to a rotatable output shaft of a motor. One or more holes 16 are provided in the disc body 2 to facilitate handling.

While the preferred embodiments have been shown and described, various modifications can be made without departing from the scope of the present invention.

What is claimed is:

1. A rotatable cutting disc assembly for use with an electrically powered food processor appliance, said disc assembly comprising a generally flat, round disc body having a center, a top surface, a bottom surface, a hub collar extending from said center in a direction perpendicular to said top and bottom surfaces, a circumferential edge, and a gap extending from said center to said circumferential edge;

a blade component, said blade component comprising a support hub being telescopically received in said hub collar, said support hub having a proximal end having external threads formed on an outer surface thereof, a support arm extending generally perpendicularly from an end of said support hub, and a cutting edge along a portion of said support arm, said blade being positioned in alignment with said gap and such that said cutting edge is in a plane generally parallel to said top surface; and an adjustment sleeve received rotatably on said proximal end of said support hub, said sleeve having internal threads formed on an inner surface thereof and interfacing with said external threads of said support hub;

wherein said adjustment sleeve is adapted to be selectively rotated to cause linear movement of said support hub relative to said sleeve to facilitate movement and positioning of said blade component relative to said disc body.

2. A disc assembly according to claim 1, further comprising a torque transmitting opening located at said center of said disc body for transmitting torque from a rotating shaft to cause said disc assembly to rotate.

3. A disc assembly according to claim 1, wherein said cutting edge is generally curved.

4. A disc assembly according to claim 1, further comprising a plurality of holes in said disc body to facilitate handling of said disc body.

5. A disc assembly according to claim 1, further comprising
a plurality of support arms extending between said hub collar and the bottom surface of said disc body.

6. A disc assembly according to claim 1, further comprising
a plurality of ribs on said adjustment sleeve.

7. A rotatable cutting disc assembly for use with an electrically powered food processor appliance, said disc assembly comprising:
a generally flat, round disc body having a center, a top surface, a bottom surface, a hub collar extending from said center in a direction perpendicular to said top and bottom surfaces, a circumferential edge, and a gap extending from said center to said circumferential edge; and
a blade component, said blade component comprising a support hub being received in said hub collar and a cutting blade having a cutting edge attached to said support hub, said blade being positioned in alignment with said gap such that said cutting edge is in a plane generally parallel to said top surface; and
wherein at least one of said hub and said support hub include a plurality of threads; and
wherein said blade is movable in a longitudinal direction relative to said disc body via said plurality of threads in order to selectively adjust slicing width.

8. The disc assembly according to claim 7, further comprising:
an adjustment sleeve received rotatably on said support hub, said sleeve having a plurality of internal threads formed on an inner surface thereof and interfacing with said plurality of threads of said at least one of said hub and said support hub;
wherein said adjustment sleeve is adapted to be selectively rotated to cause movement in said longitudinal direction in order to selectively adjust slicing width.

* * * * *